Figure 1:
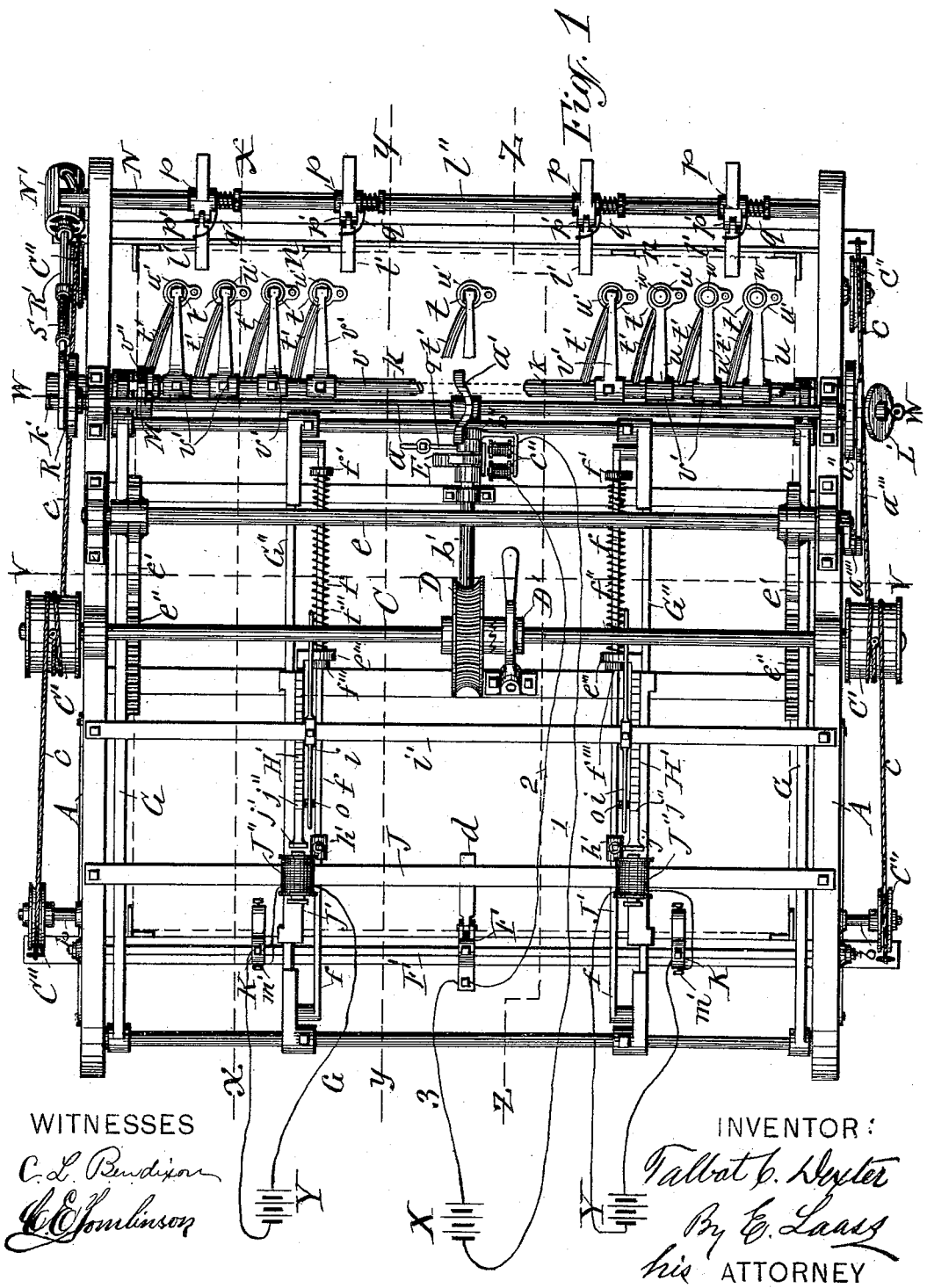

No. 620,841. Patented Mar. 7, 1899.
T. C. DEXTER.
PAPER FEEDING MACHINE.
(Application filed July 13, 1894.)

(No Model.) 13 Sheets—Sheet 1.

WITNESSES
C. L. Bendixon
E. E. Tomlinson

INVENTOR:
Talbot C. Dexter
By E. Laass
his ATTORNEY

THE NORRIS PETERS CO., PHOTO-LITHO., WASHINGTON, D. C.

No. 620,841. Patented Mar. 7, 1899.
T. C. DEXTER.
PAPER FEEDING MACHINE.
(Application filed July 13, 1894.)
(No Model.) 13 Sheets—Sheet 3.

WITNESSES:
C. L. Bendixon
C. C. Tomlinson

INVENTOR:
Talbot C. Dexter
By E. Laass
his ATTORNEY

No. 620,841. Patented Mar. 7, 1899.
T. C. DEXTER.
PAPER FEEDING MACHINE.
(Application filed July 13, 1894.)

(No Model.) 13 Sheets—Sheet 4.

WITNESSES:
C. L. Bendixon
C. E. Tomlinson

INVENTOR:
Talbot C. Dexter
By E. Laass
his ATTORNEY

No. 620,841. Patented Mar. 7, 1899.
T. C. DEXTER.
PAPER FEEDING MACHINE.
(Application filed July 13, 1894.)
(No Model.) 13 Sheets—Sheet 5.

WITNESSES:
C. L. Bendixon
C. E. Tomlinson

INVENTOR
Talbot C. Dexter
By E. Laass
his ATTORNEY

No. 620,841. Patented Mar. 7, 1899.
T. C. DEXTER.
PAPER FEEDING MACHINE.
(Application filed July 13, 1894.)
(No Model.) 13 Sheets—Sheet 7.

WITNESSES:
INVENTOR:

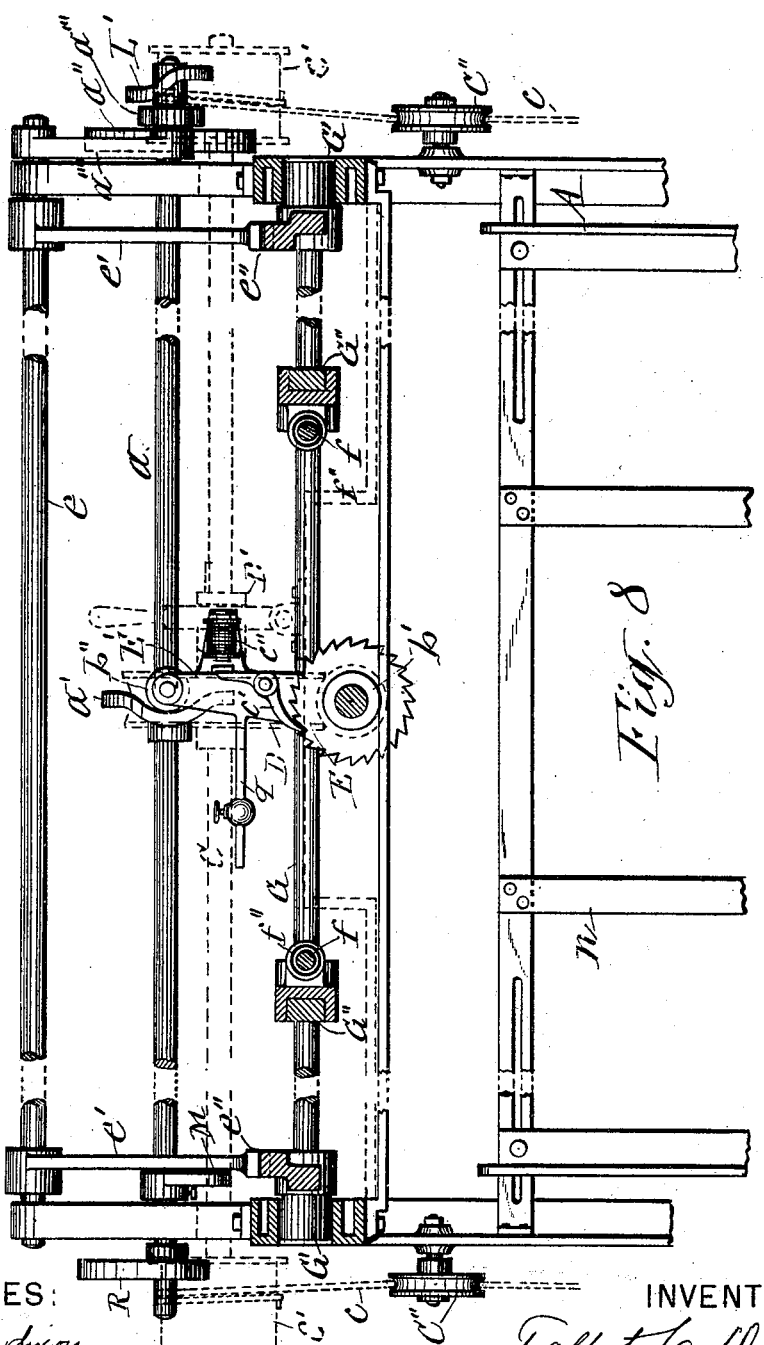

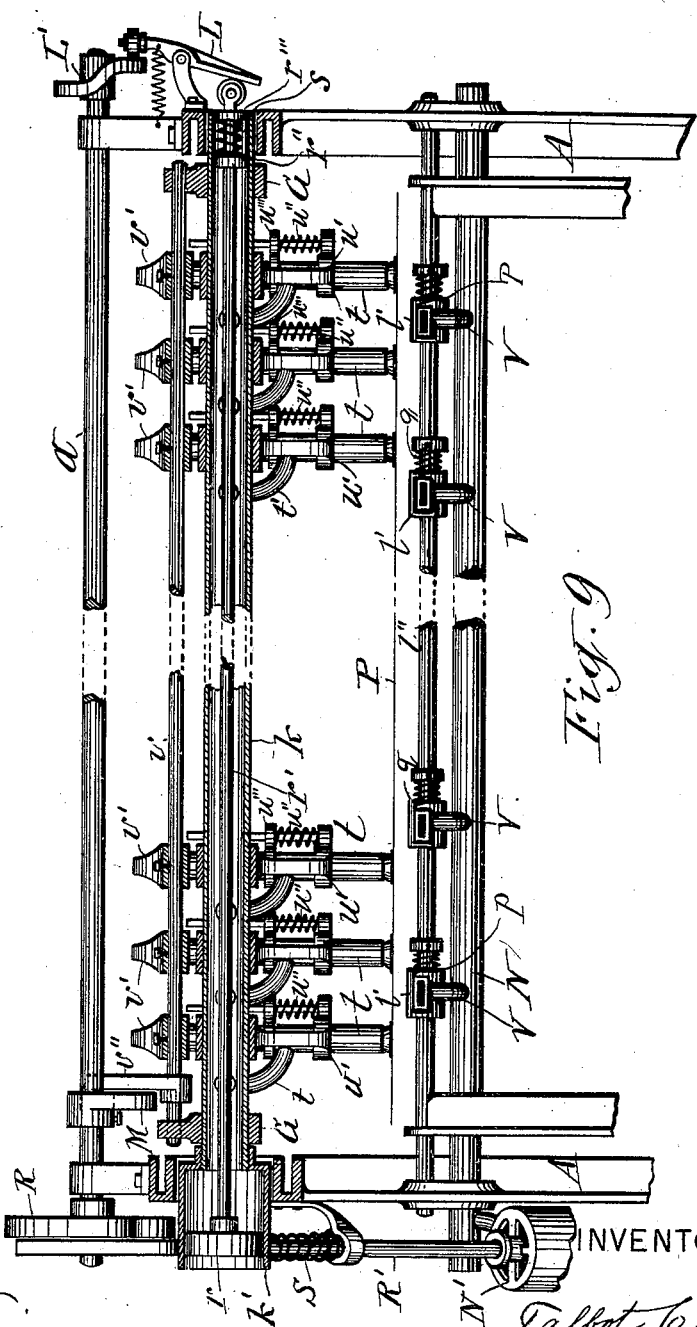

No. 620,841. Patented Mar. 7, 1899.
T. C. DEXTER.
PAPER FEEDING MACHINE.
(Application filed July 13, 1894.)
(No Model.) 13 Sheets—Sheet 10.
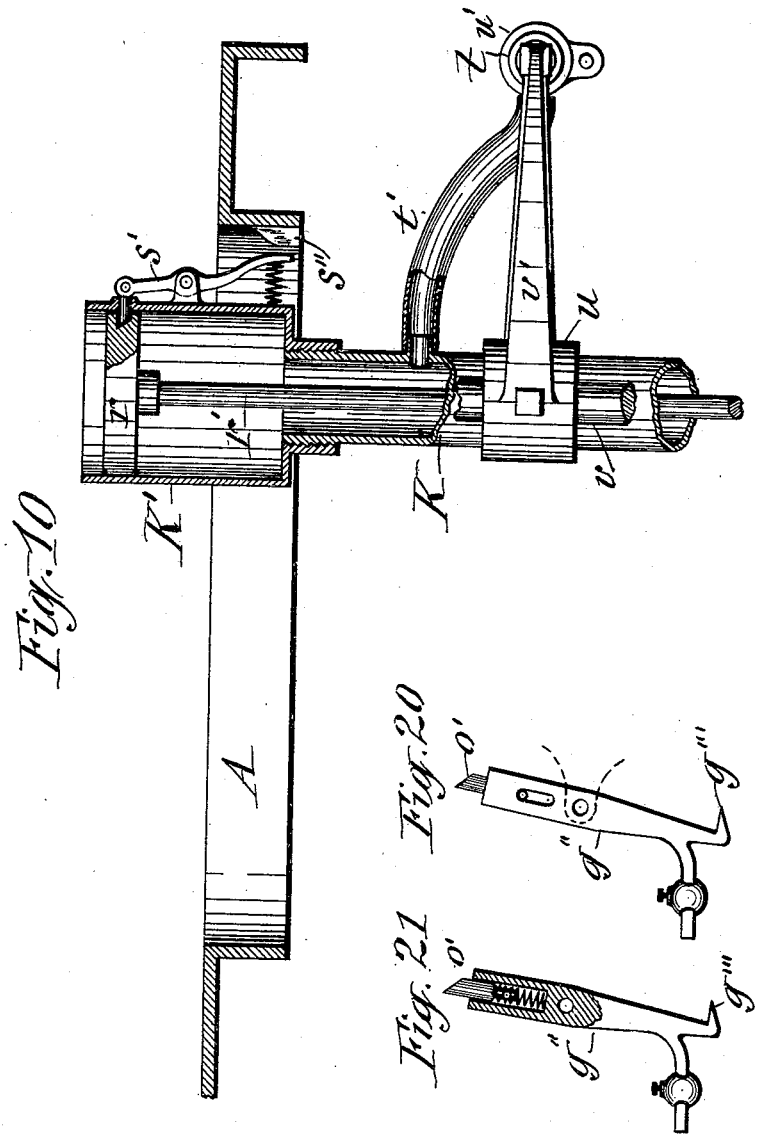
WITNESSES:
C. L. Bendixon
C. E. Tomlinson
INVENTOR:
Talbot C. Dexter
By C. Laass
his ATTORNEY No. 620,841. Patented Mar. 7, 1899.
T. C. DEXTER.
PAPER FEEDING MACHINE.
(Application filed July 13, 1894.)
(No Model.) 13 Sheets—Sheet 11.
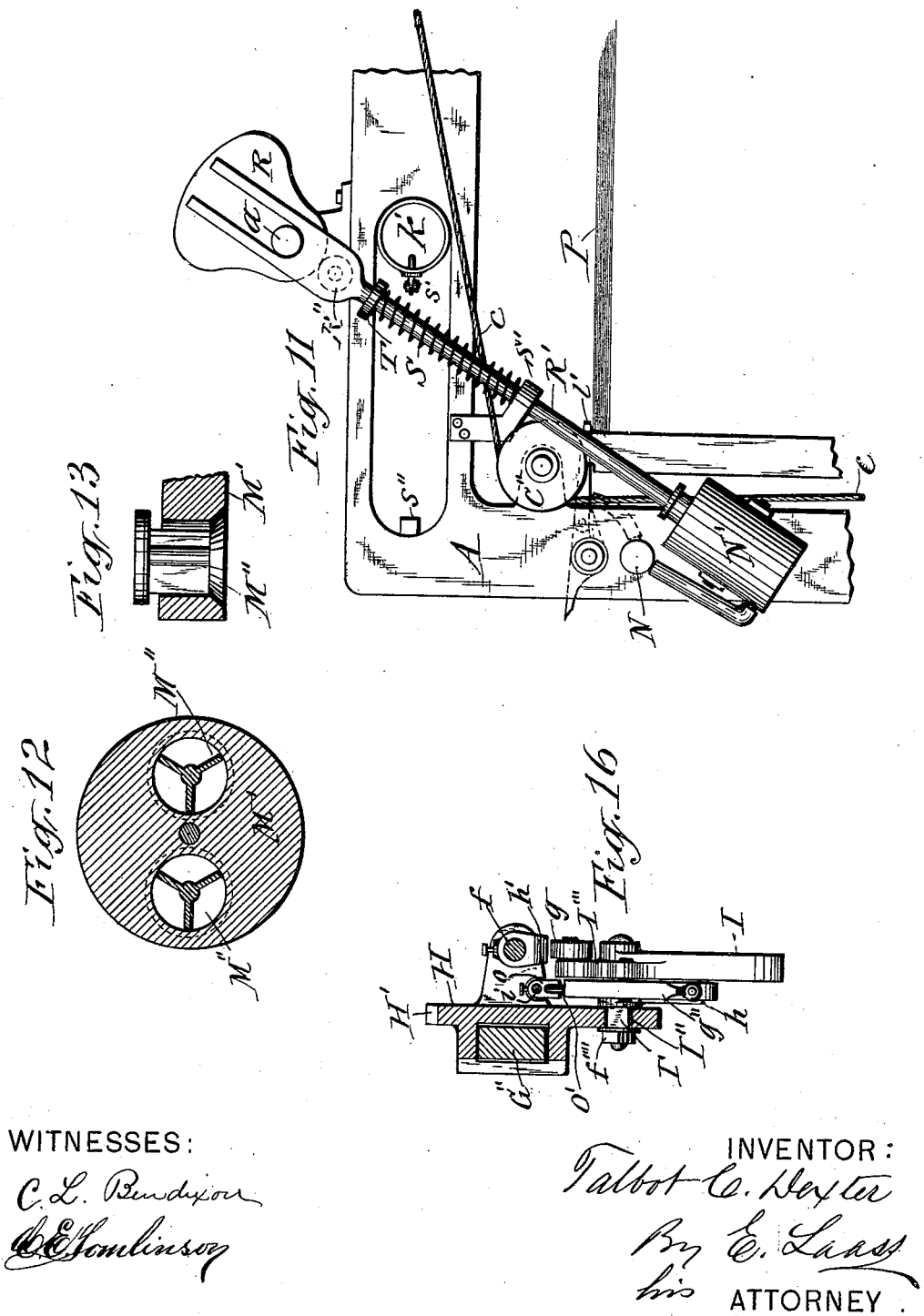
WITNESSES: INVENTOR:
Talbot C. Dexter
By E. Laass
his ATTORNEY.
THE NORRIS PETERS CO., PHOTO-LITHO., WASHINGTON, D. C.

No. 620,841. Patented Mar. 7, 1899.
T. C. DEXTER.
PAPER FEEDING MACHINE.
(Application filed July 13, 1894.)
(No Model.) 13 Sheets—Sheet 12.
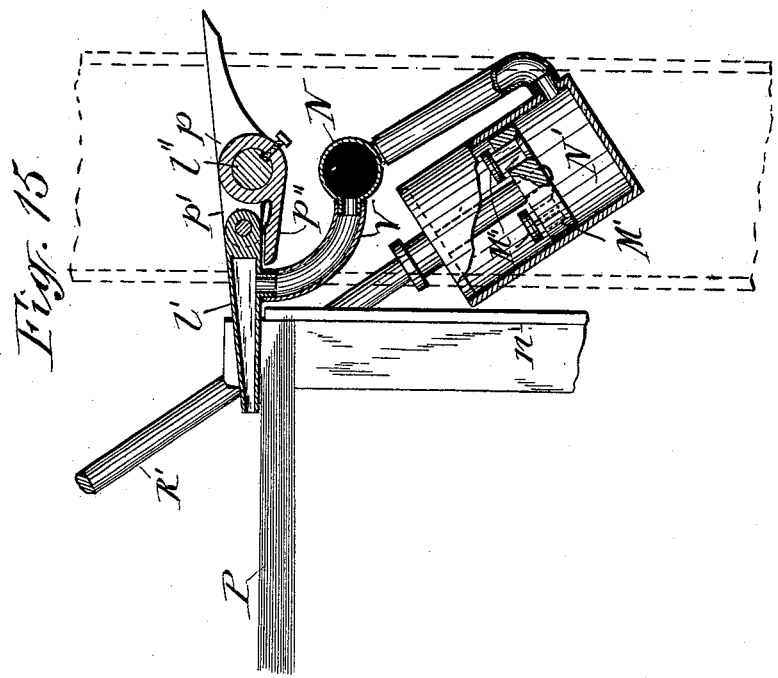
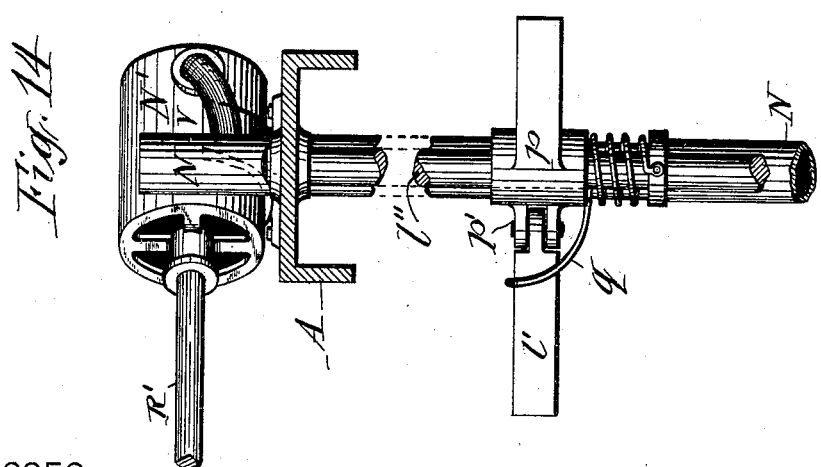
WITNESSES:
C. L. Bendixon
C. E. Tomlinson
INVENTOR:
Talbot C. Dexter
By E. Laass
his ATTORNEY.

No. 620,841. Patented Mar. 7, 1899.
T. C. DEXTER.
PAPER FEEDING MACHINE.
(Application filed July 13, 1894.)
(No Model.) 13 Sheets—Sheet 13.
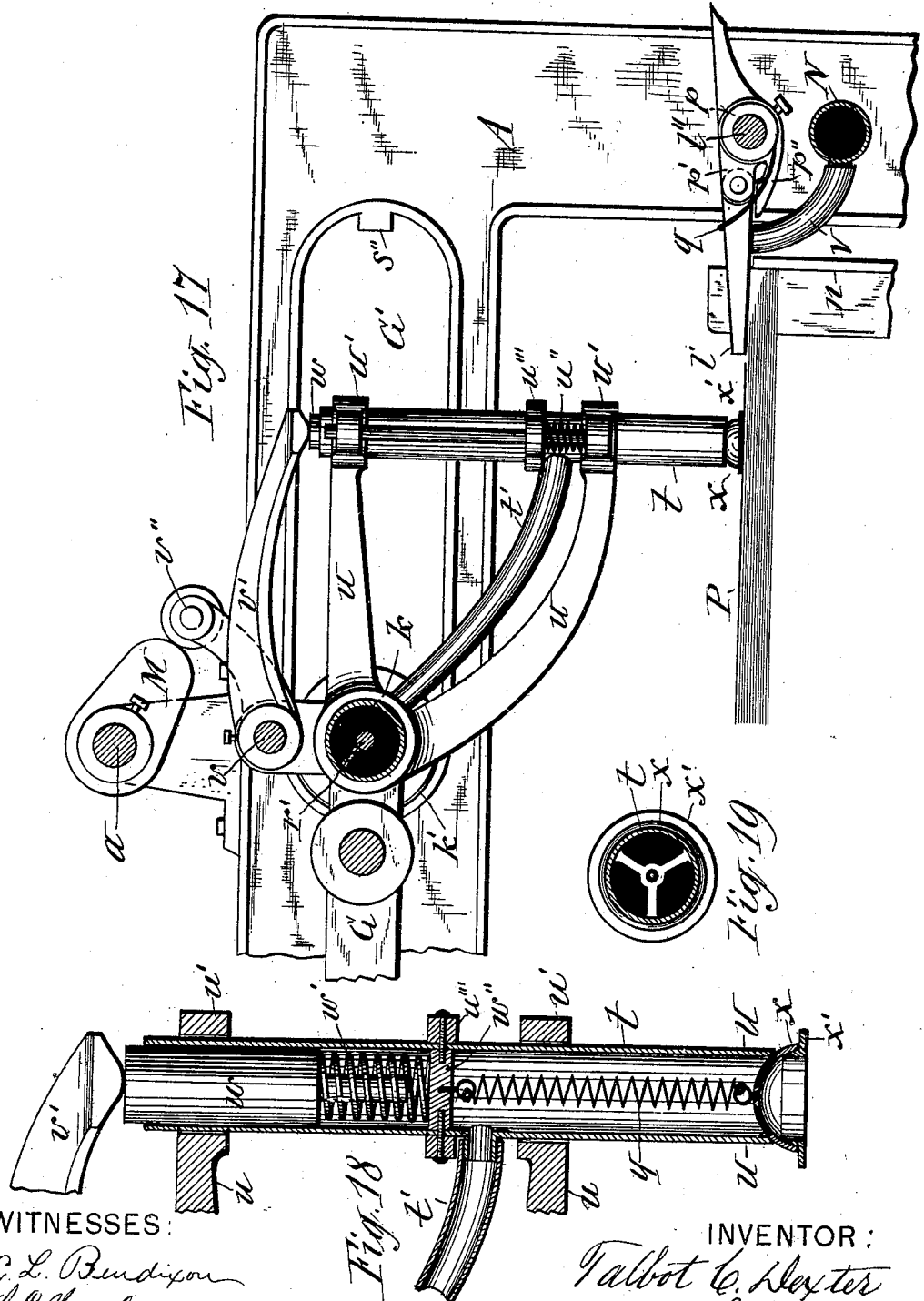
WITNESSES:
INVENTOR:
Talbot C. Dexter
By E. Laass
his ATTORNEY

UNITED STATES PATENT OFFICE.

TALBOT C. DEXTER, OF PEARL RIVER, NEW YORK.

PAPER-FEEDING MACHINE.

SPECIFICATION forming part of Letters Patent No. 620,841, dated March 7, 1899.

Application filed July 13, 1894. Serial No. 517,396. (No model.)

*To all whom it may concern:*

Be it known that I, TALBOT C. DEXTER, of Pearl River, in the county of Rockland, in the State of New York, have invented new and useful Improvements in Paper-Feeding Machines, of which the following, taken in connection with the accompanying drawings, is a full, clear, and exact description.

My invention relates to improvements in the type of paper-feeding machine in which the operative parts are automatically controlled by the movements of the sheets of an adjustably-supported pile; and the object of my invention is to improve the construction and operation of this type of machine.

My invention comprises, first, the combination of suitable means operating back and forth over a pile for moving a sheet on the pile, means operated by the sheet for checking the advancing movement of the sheet-moving means, and means for raising the sheet-moving means out of contact with the sheet after the advancing movement has been checked. The means for checking the advancing movement of the sheet-moving means comprise, preferably, a rack carried by the sheet-moving means, a tripper in the path of the sheet, and a pawl adapted to be operated by the tripper to engage the rack, and thereby arrest the operation of the sheet-moving means upon the sheet. The sheet-moving means is constructed to travel in a rectangular path and to engage the top sheet of the pile during its travel in one direction to advance or move said sheet on the pile in that direction and to be elevated from the pile after its sheet-advancing movement has been checked and maintained in elevated position during its return to initial position, where it is again lowered into engagement with the pile in readiness for the succeeding sheet-advancing movement. I also prefer to employ a yielding connection between the sheet-moving means and the driving mechanism and arrange the elevating means of the sheet-moving instrument to be operated by the relative movement between the driving mechanism and sheet-moving means.

My invention comprises, secondly, an improved arrangement of sheet-combing devices which shift a plurality of sheets upon the top of the pile, in combination with an improved arrangement of sheet-lifting devices, which take the shifted sheets successively from the pile and feed them to suitable sheet-delivering mechanism.

My invention comprises, thirdly, the combination, with the vertically-movable paper-supporting table and mechanism for raising the same automatically, of a stop-motion of peculiar construction actuated by the upward movement of said table and controlling the aforesaid mechanism; and the invention furthermore consists of numerous novel auxiliary devices and peculiarities of construction and combinations of the component parts of the machine, all as hereinafter more fully described, and pointed out in the claims.

Figure 2:
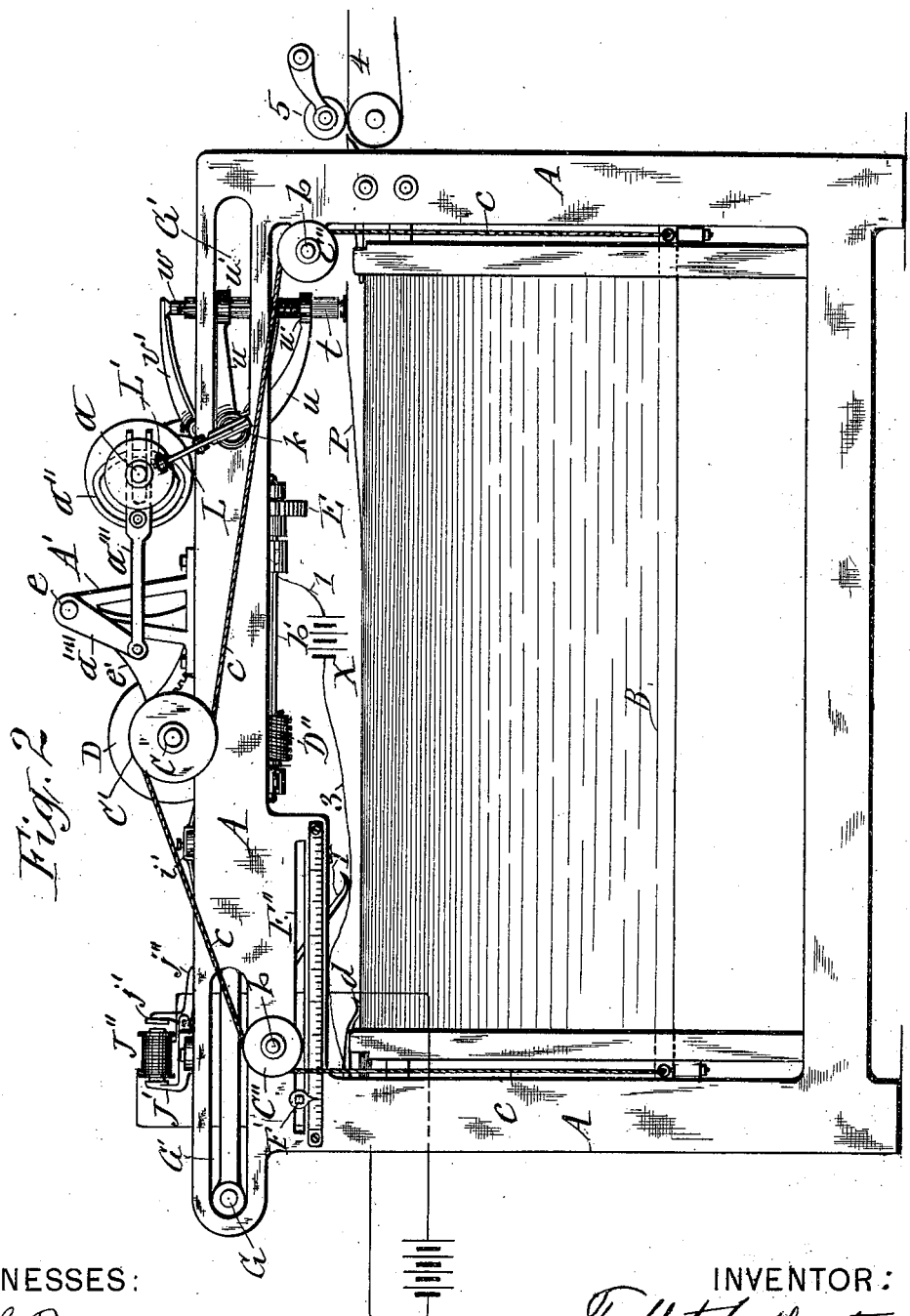
Figure 3:
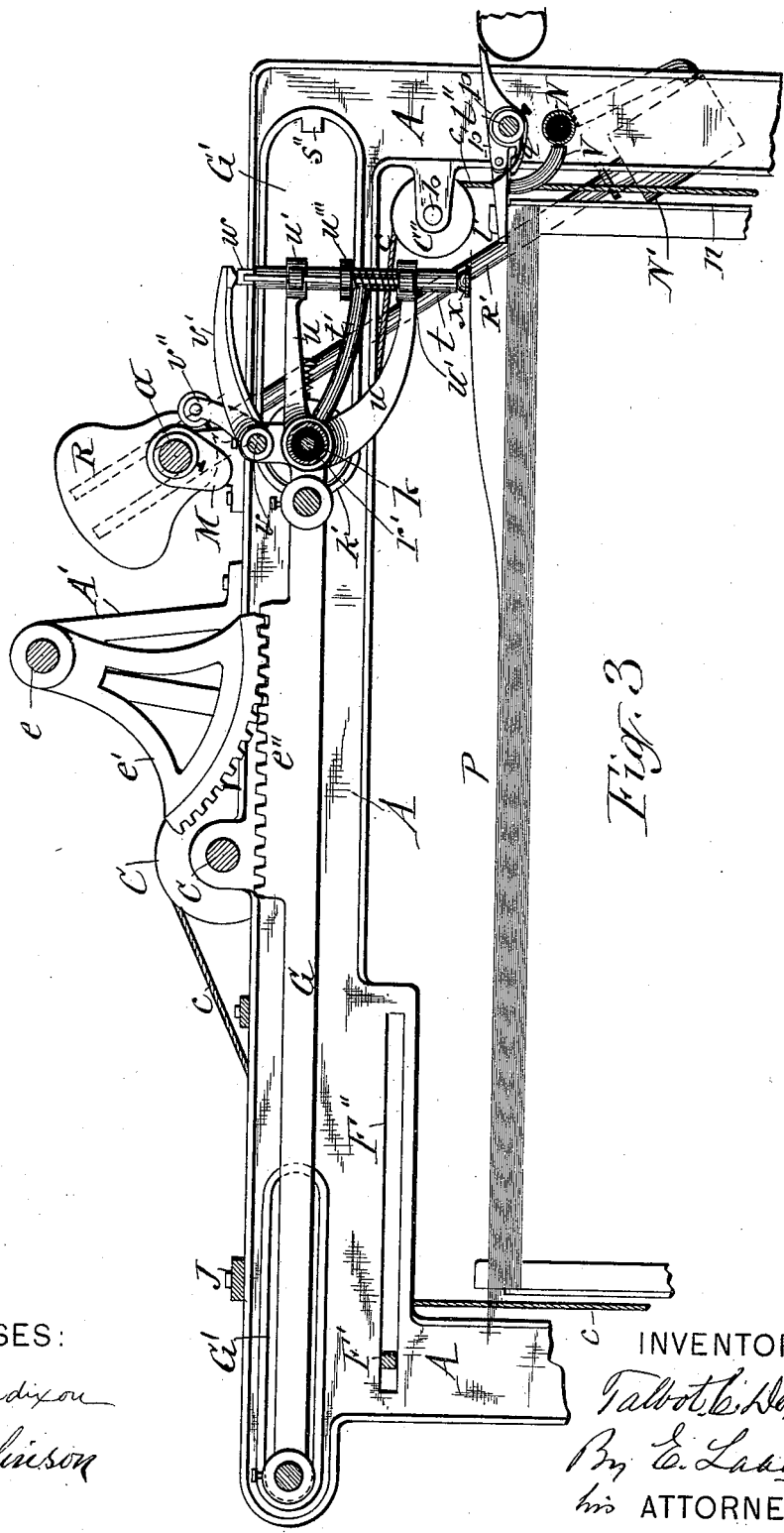
Figure 4:
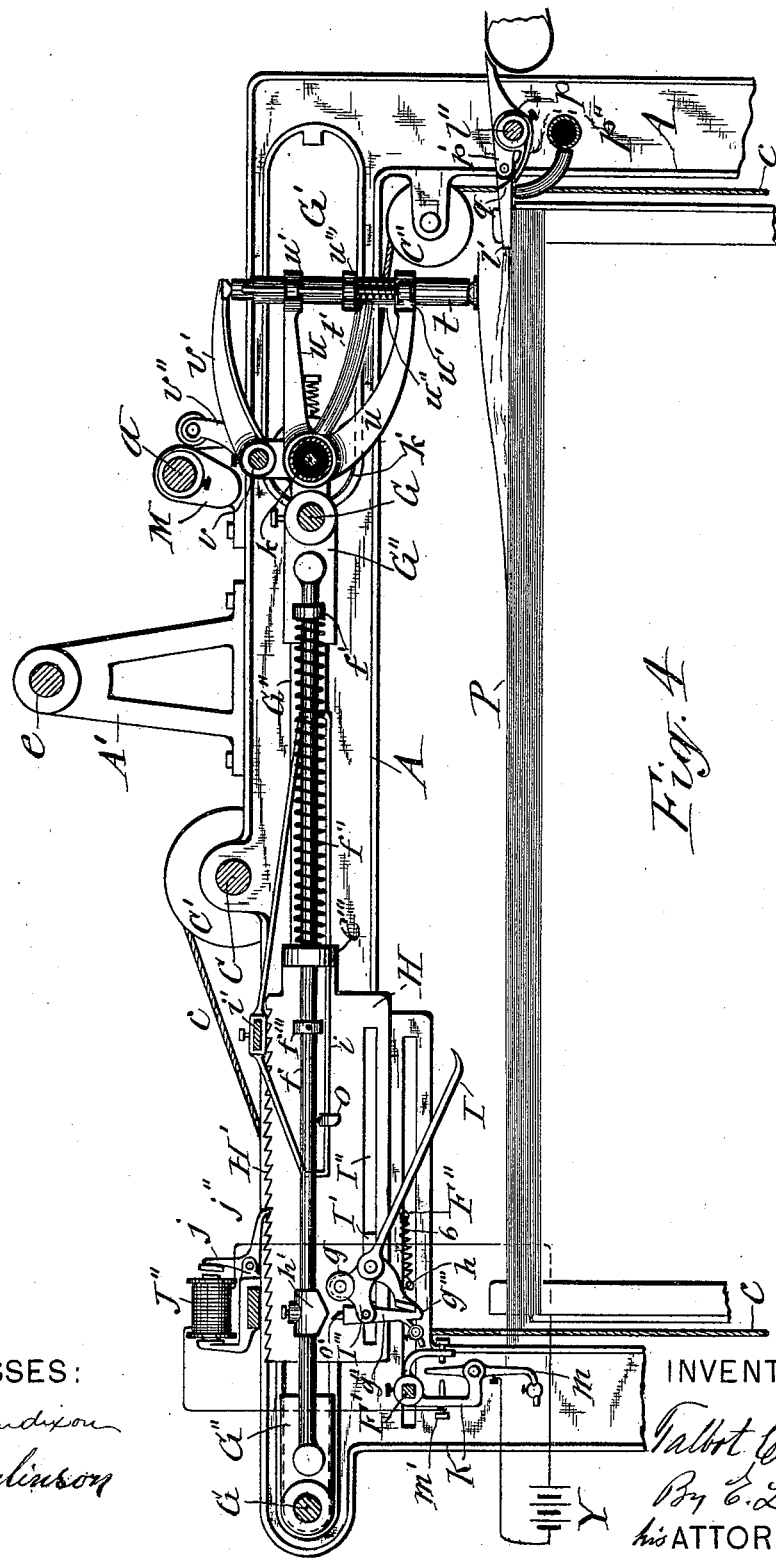
Figure 5:
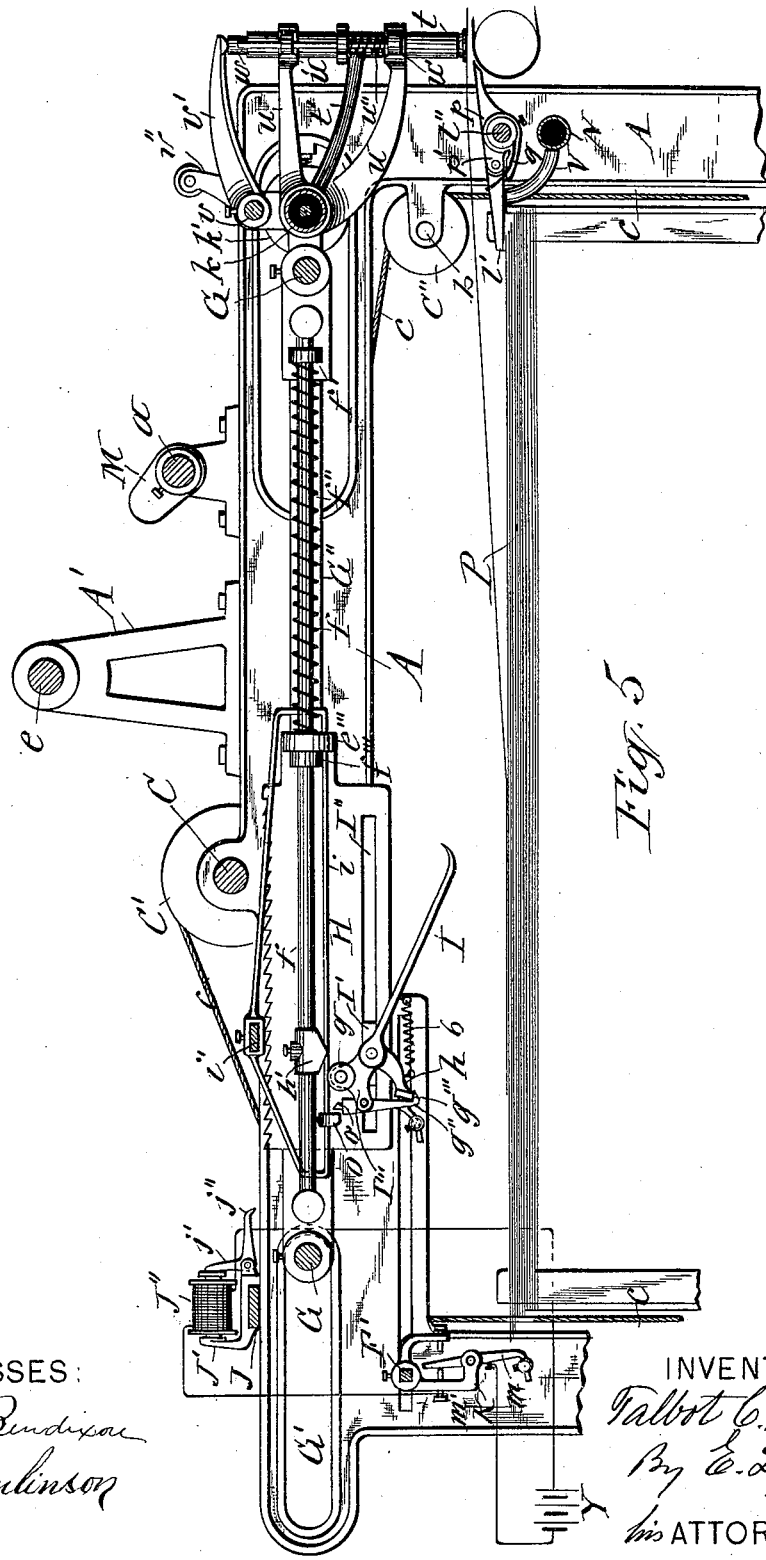
Figure 6:
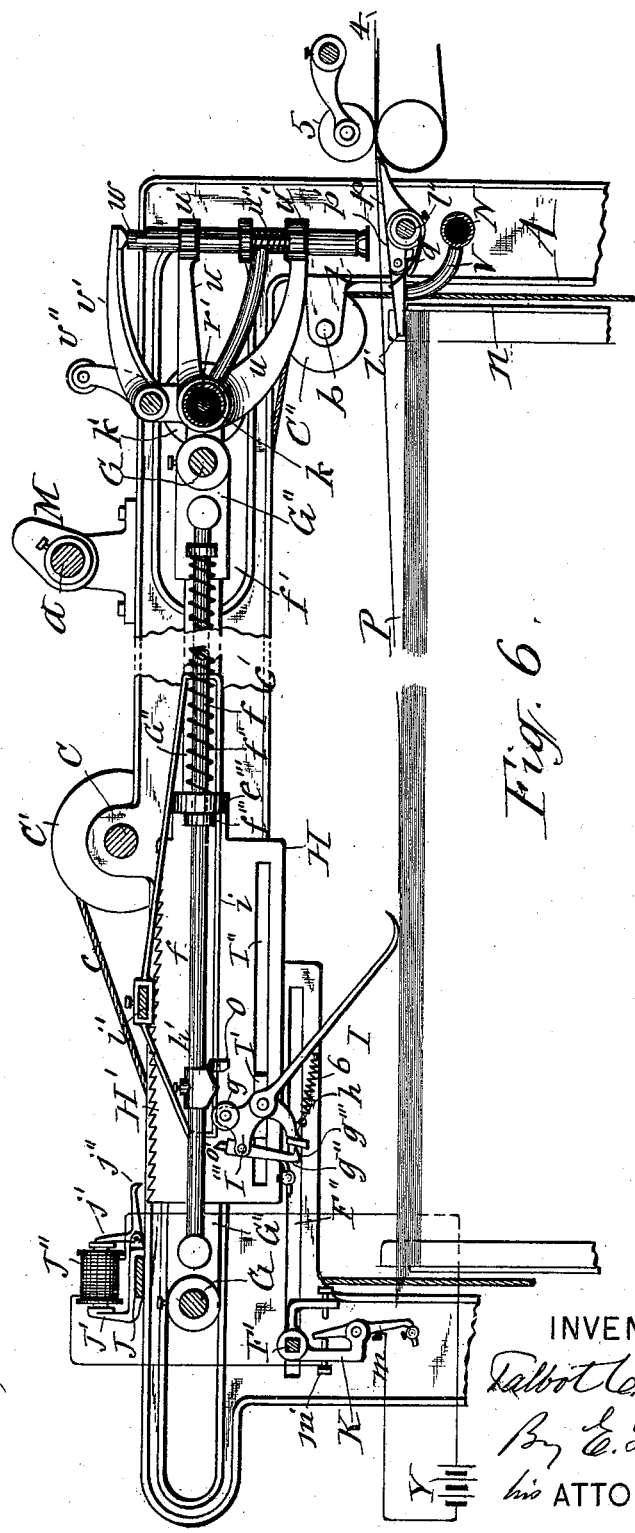
Figure 1:
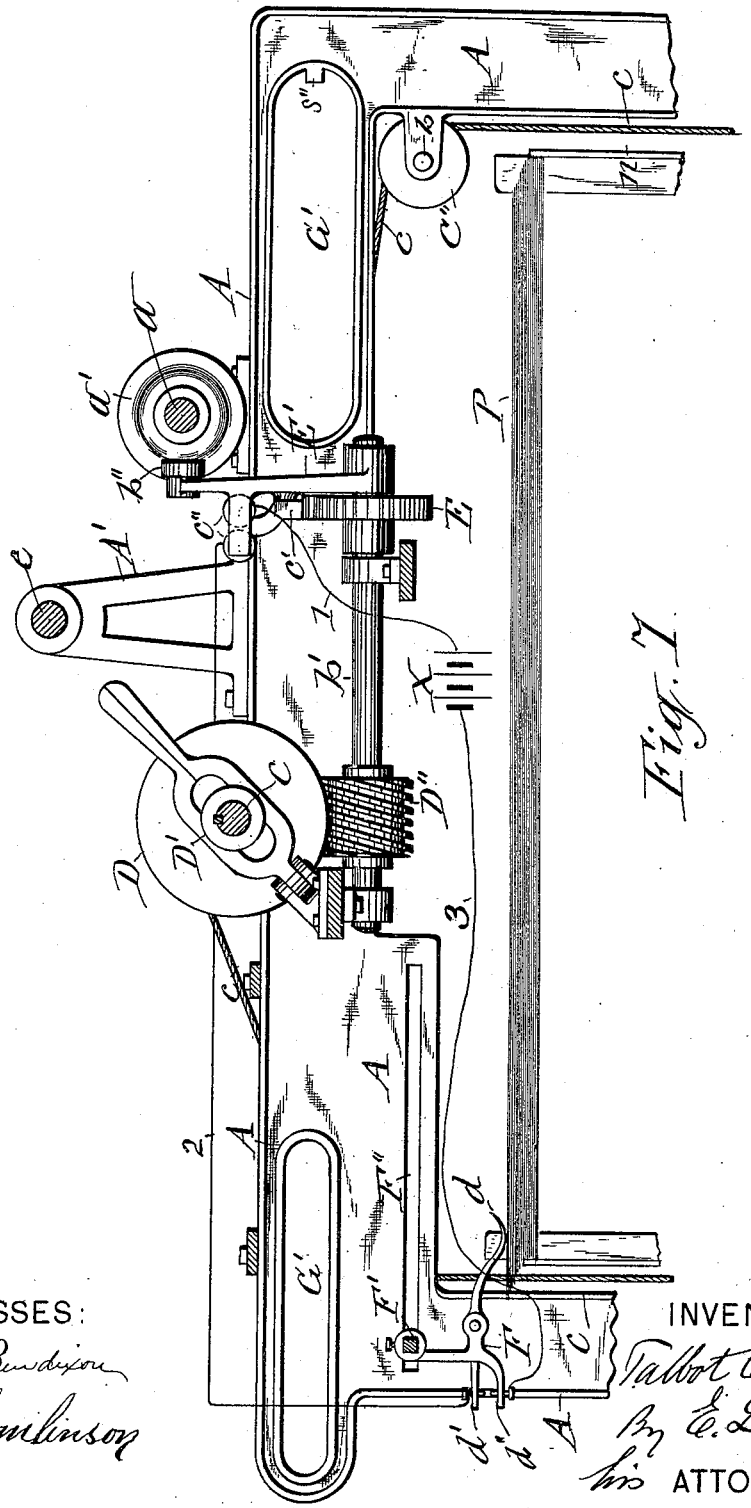

In the annexed drawings, Figure 1 is a plan view of a paper-feeding machine embodying my invention. Fig. 2 is a side elevation of the same. Fig. 3 is a vertical longitudinal section on line X X in Fig. 1. Figs. 4, 5, and 6 are vertical longitudinal sections on line Y Y in Fig. 1, showing the paper-feeding devices in different operative positions. Fig. 7 is a vertical longitudinal section on line Z Z in Fig. 1. Figs. 8 and 9 are vertical transverse sections, respectively, on lines V V and W W in Fig. 1. Fig. 10 is an enlarged plan view of the air-pump of the suction-pipes, shown partly in section to illustrate the details thereof. Fig. 11 is a side view of the pump of the blowpipes with the means for operating said pump. Fig. 12 is an enlarged transverse section of the piston of the latter pump. Fig. 13 is a side view of one of the valves of said pump. Fig. 14 is an enlarged plan view of the air-pump and blowpipe connected thereto, including the tubular finger which receives the air from said pipe and blows under the raised front edge of the top sheet of paper. Fig. 15 is a longitudinal section of said parts. Fig. 16 is a rear face view of one of the combers. Fig. 17 is an enlarged side view of one of the vertically-movable air-suction tubes in its depressed position for lifting the top sheet. Fig. 18 is a further enlarged longitudinal section of said tube. Fig. 19 is a transverse section on line U U in Fig. 18, and Figs. 20 and 21 are respectively side and longitudinal sectional views of the comber-engaging latch.

Similar letters and figures of reference indicate same parts throughout the several views.

A represents the main frame of the paper-feeding machine of any suitable shape.

B denotes the vertically-movable table or platform for carrying the pile of paper from which the sheets are to be successively fed. To lift said table automatically so as to keep the top of the pile of paper in the plane of the feed, I employ suitable mechanism receiving motion from the driving-shaft of the feeding-machine and control said motion by an automatic stop-motion actuated by the raising and lowering of the pile upon said table. The preferred lifting mechanism is illustrated in the annexed drawings. A shaft C extends across the top of the machine and is journaled in bearings on the top of the frame A. To the opposite ends of said shaft are secured drums $C'$ $C'$, and to shafts $b$, extending across the ends of the frame A, are connected sheaves $C''$ $C''$.

$c$ $c$ are two pairs of cables or chains, each pair being fastened at one end to one of the drums $C'$ $C'$ and wound in opposite directions thereon, and passed thence over the sheaves $C''$ $C''$ on the same side of the frame A, and thence down to the table B, to which they are securely fastened.

On the central portion of the shaft C is loosely mounted a gear-wheel D, having a sliding clutch connection $D'$ with the shaft. This gear-wheel engages a worm $D''$, attached to a counter-shaft $b'$, to which latter is also attached a ratchet-wheel E.

$a$ is the driving-shaft, to which is secured a cam-wheel $a'$. An arm $E'$ is loosely mounted on the counter-shaft $b'$, to the free end of which arm is pivoted a roller $b''$, by which said arm bears on the cam-wheel $a'$, and thereby receives a rocking motion, which is transmitted to the counter-shaft by a pawl $c'$, connected to the arm $E'$ and engaging the ratchet-wheel E. Said motion being transmitted to the shaft C by the worm $D''$ and gear D causes the cables or chains to be wound upon the drums $C'$ $C'$ and the table B to be lifted to bring the top of the pile of paper in the plane of feeding.

The roller $b''$ may be held in contact with the cam-wheel $a'$ by a weighted arm $g$, extending laterally from the arm $E'$, as shown in Fig. 8 of the drawings.

When the paper is exhausted from the table B, the latter is readily lowered to receive another pile of paper by throwing the clutch $D'$ out of engagement with the wheel D and allowing the table to descend by gravity. To automatically control the elevation of said table, I employ the electrically-controlled stop-motion consisting of a suitable gage $d$, disposed yieldingly over the table B and in the plane of the feed. I preferably pivot said gage to a stationary bracket F, mounted longitudinally adjustable on a rod $F'$, which passes through longitudinal slots $F''$ in the sides of the frame A and is adjustably clamped to the frame. The bracket F is thus adjustable to allow the gage $d$ to be placed in proper position over paper of different sizes. Said gage is formed with a rearward extension which carries one of the poles $d'$ of the electric-circuit controller. The companion pole $d''$ is attached to the bracket $F'$. To the pawl $c'$ is attached the armature of the electromagnet $c''$, which is fastened to the rock-arm $E'$, as more clearly shown in Fig. 8 of the drawings. One wire, 1, connects the magnet with the battery X. Another wire, 2, connects the magnet with one of the aforesaid poles of the circuit-controller. The other pole is connected with the battery by a wire 3, as shown in Fig. 7 of the drawings. The operation of said stop-motion is as follows: The table B having been raised by the described mechanism to a proper elevation to carry the top of the pile of paper to the plane of the feed causes the gage $d$ to bring the pole $d'$ in contact with the pole $d''$, and thus closes the circuit and energizes the magnet $c''$, which attracts the armature, and thereby throws the pawl $c'$ out of engagement with the ratchet-wheel B and arrests the motion of the shaft D, to which the drums $C'$ $C'$ are attached. The table B remains at rest until a sufficient number of sheets are fed from the pile to cause the circuit to become broken by the gage $d$, which rests upon the top of the pile and descends as the sheets are drawn from under it. The breaking of the circuit causes the magnet $c''$ to release the pawl $c'$, which then engages the ratchet-wheel E and transmits motion to the shaft C. The drums are thereby caused to wind up the cables or chains $c$ and lift the table B until the pile of paper is elevated, so as to cause the top of the pile to lift the gage $d$, which breaks the circuit and arrests the elevating mechanism, as before described.

G designates a carriage or longitudinally-movable frame which slides in horizontal longitudinal guides $G'$ in the sides of the frame A and receives an intermittent reciprocating motion from the driving-shaft $a$ by means of a cam $a''$, attached to said shaft, and a pitman $a'''$, connected to a crank $a''''$, which is fastened to the end of a shaft $e$, mounted in bearings on top of posts $A'$, rising from the sides of the frame A. To the shaft $e$ are also attached toothed segments $e$ $e'$, which engage longitudinal racks $e''$ $e'''$, attached to the sides of the carriage G, which is compelled to move in a plane parallel with the paper-supporting table B by the guides $G'$ $G'$.

I I represent the sheet-shifting instruments, shown in the form of combers, which I employ for the purpose hereinbefore stated. Said sheet-shifting combers are carried back and forth over the pile of paper by the aforesaid carriage and are alternately dropped onto and lifted from the top of the pile by the following mechanism:

On longitudinal rods G'', attached to the carriage G, are mounted longitudinally-movable rider-brackets H, each of which receives positive forward movement from the carriage by means of a perforated ear $e'''$, fixed to the rider and receiving through it a straight longitudinal bar $f$, which is secured at its opposite ends to the rod G'' and has secured to it a collar $f''''$, back of the ear $e'''$, to come in contact therewith during the forward movement of the carriage. Between the ear $e'''$ and a collar $f'$, attached to the bar $f$, near the front end thereof, is an expansion spiral spring $f''$, surrounding the bar $f$ and abutting against the aforesaid ear and collar. The two springs $f''$ and $f'''$ are of sufficient tension to push the two riders H H rearward with the rearward movement of the carriage. To each of these riders is connected one of the sheet-shifting instruments I. I have represented the sheet-shifting instruments I in the form of mechanical combers, consisting, essentially, of fingers or analogous instruments carried back and forth over the pile of paper and provided with hard smooth bearing-surfaces, by which they press upon the top sheet of the pile during their movement in one direction. It is not essential to use combing instruments in my improved machine, except in certain combinations of features, indicated in the claims. In certain other broader combinations, recited in the claims and not limited to combing devices, other forms of sheet-feeding instruments may be employed without departing from the spirit of my invention. I preferably employ two or more of said sheet-feeding instruments I, each of which is pivoted to a block I', seated longitudinally adjustable in a slot I'', extending lengthwise of the rider-bracket, which slot allows the feeding instrument to be adjusted in its position to operate on paper of different sizes. The pivot-pin of the feeding instrument passes through the block and is shouldered against one side of the rider-bracket and has its protruding end screw-threaded and provided with a nut $f'''''$, by which the block is clamped in its required position on the rider-bracket, as more clearly shown in Fig. 16 of the drawings. The feeding instrument receives a downward pressure by means of a suitable spring 6, connected to the block I' or to the catch $h$, affixed to said block.

To allow the instruments I to be shifted laterally to operate on sheets of different widths, I mount the rods G'' laterally adjustable on the carriage G.

The instruments I are each formed with an upward and rearward extension I''', to the upper part of which I preferably pivot a small roller $g$ and to the rear portion of which I pivot a latch $g''$, having its lower end formed with a hook $g'''$, which is adapted to engage and release a catch $h$, extending from the block I'. The upper end of said latch is provided with a spring-bolt $o'$, which allows the latch to be carried forward without being thrown out of engagement with the catch $h$ by the tripper $o$.

To the bar $f$ is connected a lug $h'$, which is also adjustable longitudinally on the bar to conform to the adjustment of the feeding instrument. Another rod $i$, parallel with the bar $f$, is secured to a cross-bar $i'$, mounted on the main frame A, and to said rod $i$ is connected the tripper O, which is also adjustable longitudinally in its position for the purpose hereinbefore stated.

To automatically and independently control the feeding action of the sheet-shifting instruments, I employ two independent sheet-actuating tripping devices, as I will now describe.

Each rider-bracket H is provided with a longitudinal rack-bar or ratchet H', having rearwardly-pitched teeth, and upon a cross-bar J, secured to the frame A, are mounted brackets J', to which are secured the electromagnets J'', the armatures of which are attached to arms $j'$, formed integral with the pawls or dogs $j''$, pivoted to the brackets and adapted to engage and release the ratchets. The independent trippers (shown in the form of circuit-controllers) are mounted on brackets K K, which are supported longitudinally adjustable on the cross-bar F', which latter is adjustably connected to the sides of the frame A, as hereinbefore described, thereby making said trippers adjustable to different-sized sheets. The trippers are preferably in the form of vibratory circuit making and breaking fingers $m$, each pivoted at or near the center to the lower end of the bracket K and having its upper end held normally in contact with one of the poles $m'$ of the electric circuit generated by the battery Y. The tripping-finger $m$ is suitably insulated from the bracket and constitutes the companion pole of the circuit, in which is included the magnet J''. The circuit is thus normally closed and the magnet J'' is caused to attract its armature, and thereby lift the dog $j''$ and hold it out of engagement with the rack H'.

The operation of the sheet-shifting devices I are controlled by the described stop-motion in the following manner: The electric-circuit controllers are set in position to bring the lower end portion of the tripper-finger $m$ a short distance from the rear edge of the pile of paper, which latter is placed with its front edge snugly against suitable vertical gages $n$ on the frame. During the rearward movement of the carriage G the sheet-shifting combers drag upon the top of the pile of paper and by pressure upon the top sheet and a limited degree of friction between the subjacent sheets a plurality of sheets of the upper portion of the pile are shifted rearward, so that each of said sheets projects with its advance edge beyond the next underlying sheet. In this combing process the rear advanced edge of the top sheet is brought into contact with the lower ends of the tripper-fingers $m$, and thereby breaks the electric circuits. This allows the dogs $j''$ to drop into engagement with the rack-bars or ratchets H′, and thus arrest the further rearward or feeding movement of the rider-brackets, while the carriage G continues to move a short distance rearward and brings the lugs $h'$ in contact with the rollers $g$ on the upper ends of the sheet-shifting combers, which are thereby lifted from the paper. In this tilting movement of the combers the latches $g''$ engage the catches $h$, and thereby retain the combers in their raised position. The top sheet of the pile is subsequently drawn forward by the paper-feeding devices, hereinafter described, and releases the tripper-fingers $m\ m$ from the pressure of the top sheet and allows them to fall automatically into contact with the poles $m'\ m'$ and again close the circuits. The magnets, however, are unable to draw the dogs $j''$ immediately out of engagement with the ratchets, owing to their firm engagement produced by the rearward pressure against the front ends of the rider-brackets by the springs $f''$, which are compressed during the rearward movement of the carriage after the movement of the rider-brackets has been arrested. In the forward movement of the carriage the rider-brackets H remain at rest until the springs $f''$ are relaxed sufficiently to allow the magnets to lift the dogs $j''$. In said forward movement of the carriage the latches $g''$ pass under the trippers $o$ without being thrown out of engagement with the catches $h$; but in the next rearward movement the spring-bolts $o'$ of the latches strike with their square faces the square faces of the trippers and cause the latches to become released from the catches $h$, and thus permit the feeding instruments I to again drop onto the top sheet of the pile for another feeding stroke. I employ suitable fingers $l'$, bearing on the top of the front portion of the pile of paper, so as to cause the top sheet to be drawn from under them by the combers and produce sufficient friction between said sheet and subjacent sheet to cause the latter to be drawn partly along with the top sheet. Said fingers $l'$ are mounted upon a rod $l''$, which extends horizontally across the front of the frame A beneath the plane of feeding and rigidly secured to the frame. To said rod I connect brackets $p$, provided with sleeves through which the rod passes. Said brackets can be shifted lengthwise of the rod to adjust them to different widths of paper to be fed, and by means of set-screws connected to the sleeves and engaging the rod the brackets are retained in their required positions. These brackets are formed with rearwardly-projecting perforated ears $p'$, to which the fingers $l'$ are hinged, so as to allow the free ends thereof to move vertically and constantly bear on top of the pile of paper, (indicated at P in the drawings.)

To support the free ends of the fingers when the paper is exhausted from the table B and while the latter is lowered to receive another pile of paper, I form the brackets $p$ with rearwardly-projecting lips $p''$, under and extending beyond the ears $p'$, for the fingers to rest upon. The fingers are made to bear on top of the pile of paper with the requisite pressure by means of suitable springs $q$, attached to the brackets and exerting a downward pressure upon the fingers, as more clearly shown in Fig. 17 of the drawings.

For lifting the front edge of the top sheet after the same has been withdrawn from under the fingers $l'$ by the combers I and preparatory to feeding said sheet from the pile I employ the vertically-movable pneumatic tubes $t\ t$, which are carried back and forth over the pile of paper by the carriage G and are operated by the following mechanisms: Across the front end of the carriage and firmly secured thereto is the main air-pipe $k$, to which is attached the air-pump $k'$, as more clearly shown in Fig. 10 of the drawings. $r$ denotes the piston of said pump and $r'$ the piston-rod, which extends lengthwise through the pipe $k$ and through the head $r''$, which closes the end of the pipe farthest from the pump. The protruding end of the rod has fastened to it a collar $r'''$, and between the collar and aforesaid head is interposed an expansive spiral spring $s$, as shown in Fig. 9, which forces the piston-rod in one direction. To force it in the opposite direction at the proper time, a lever L is fulcrumed on the main frame in such a position as to allow one end of said lever to bear on the end of the piston-rod when the pipe $k$ is carried to its rearmost position by the carriage G. The opposite end of the lever L is held in contact with a cam L′, attached to the driving-shaft $a$, said cam imparting an oscillatory motion to the lever and shaped to swing the lower end of the lever outward and from the end of the piston-rod during the travel of the pipe $k$ forward and back to its rearmost position, and then swing the lower end of the lever inward and cause the same to force the piston-rod back toward the pump, and thereby produce a suction through the pipe $k$. This piston-rod and piston are to be retained in said rearward-pressed position during the forward movement of the pipe $k$, for the purpose hereinafter explained. To effect this temporary arrest of the piston-rod and piston, I provide the cylinder of the pump with a suitable catch $s'$, retaining the piston in its aforesaid position, and attach to the frame A a suitable tripper $s''$, which throws said catch out of engagement with the piston at the extreme forward position of the carriage G. (See Fig. 10.) As soon as the piston is released it is forced toward the pipe $k$ by the spring $s$, and thereby produces a puff of air into said pipe.

The tubes $t\ t$, hereinbefore referred to, communicate with the pipe $k$ by hose or flexible tubes $t'\ t'$ and are supported on said pipe by means of brackets $u\ u$, fastened to the pipe, each of which brackets is formed with forwardly-extending arms disposed one above the other and terminated with vertical eyes $u'\ u'$, which are in line with each other and loosely embrace the tube $t$, as clearly illustrated in Figs. 17 and 18 of the drawings.

The tubes $t$ are each sustained normally elevated from the pile of paper by means of springs $u''$, interposed between a lug on the lower arm of the bracket and a lug on a collar $u'''$, attached to the tube above said arm, and all are depressed to simultaneously come in contact with the top of the pile of paper when the carriage G is in its rearmost position. Said depression of the tubes is effected by means of a rock-shaft $v$, disposed parallel over the pipe $k$ and mounted in bearings formed on the brackets $u\ u$. From the rock-shaft extend arms $v'\ v'$, each of which is directly over one of the tubes $t$.

The rock-shaft receives its motion from an arm $v''$, attached to said shaft and bearing with its free end on a cam M, attached to the driving-shaft $a$. This cam and the cam $a'$, which actuates the carriage G, are shaped to cause the tubes $t\ t$ to be depressed while the carriage is held at rest in its rearmost position. During this period the cam L', hereinbefore referred to, operating through the lever L, presses the pump-piston $r$ rearward or from the pipe $k$, and thereby produces a suction through the tubes $t\ t$, which by external atmospheric pressure lift the front edge of the top sheet released from the fingers $l'$ by the rearward combing of said sheet. Said action of the tubes $t\ t$ is illustrated in Fig. 4 of the drawings. The piston of the air-pump being retained in its aforesaid position during the forward travel of the carriage, as hereinbefore described, causes the tubes $t\ t$ to carry along with them the sheet adhering thereto, as illustrated in Fig. 5 of the drawings. The piston being then released by the trippers $s''$, produces a puff through the tubes $t\ t$, and thereby throws the sheet from said tubes and leaves it in position to be carried forward from the pile to the machine designed to operate on the sheet. The conveying of the sheet to said machine may be effected either by traveling endless tapes 4 and a drop-roller 5, as represented in Fig. 6 of the drawings, or by other suitable well-known devices, such as reciprocating grippers, &c. The mechanism for feeding the successive separated sheets from the pile effects the withdrawal of said sheets from engagement with the tripper-fingers, thereby allowing the tripper-fingers to resume their normal position.

In order to permit the tubes $t\ t$ to accommodate themselves to any unevenness in the surface of the top of the pile of paper, I provide each of said tubes with a plunger $w$ inside thereof and seated upon a spiral spring $w'$, resting upon a diaghragm $w''$, secured inside of the tube, as illustrated in Fig. 18 of the drawings.

Inasmuch as it is essential to press all of the tubes $t\ t$ in perfect contact with the top sheet of the pile and all the depressing-arms $v'\ v'$ have a uniform stroke, the aforesaid spring-seated plungers $w$ perform an important function in allowing the tubes $t\ t$ to yield and conform to any unevenness that may exist in the heights of the pile of paper under the respective tubes. To obtain a perfect bearing of the tube $t$ upon the paper, I provide said tube with a yielding foot $x$, of the form of a semispherical skeleton plate, seated with its convex side on the end of the tube and sustained thereon by a spiral spring $y$, located inside of the tube and connecting said plate to the diaphragm $w'''$, secured to the table. To the edge of the said foot or plate is secured a rubber facing $x'$, which serves to render the bearing of the foot upon the paper air-tight, and thus insure the adhesion of the paper to the tube by atmospheric pressure.

To facilitate the removal of the top sheet from the pile of paper after the front edge of said sheet has been lifted, I employ a pipe connected to an air pump or blower for forcing air through said pipe under the lifted front portion of the top sheet and directly over the top of the subjacent sheet held down by the fingers $l'\ l'$. The forcing of the air between said sheets effectually separates them from each other and buoys the top sheet during its transit from the pile of paper.

It is obvious that various means may be employed for conducting the air in the aforesaid direction between the two uppermost sheets, and I therefore do not limit myself specifically to the devices shown in the annexed drawings, which merely show my preferred construction, wherein N designates the main air-blast pipe, which extends across the front of the frame A beneath the plane of feeding of the paper from the pile. Said pipe is closed at one end and connected at the opposite end to one end of the cylinder of the air-pump N'. (Shown more clearly in Figs. 11, 14, and 15 of the drawings.) The opposite end of said cylinder is open or provided with suitable air-let, and the piston M' of said pump is provided with valves M'', which open toward the open end of the cylinder. Said valves are shown in detail in Figs. 12 and 13 of the drawings. The piston receives a reciprocating motion from a cam R, secured to the driving-shaft $a$, and actuates the piston-rod R', to which is pivoted a roller R'', held in contact with the cam by a spring F, surrounding the piston-rods and bearing with one end on a bracket S', attached to the frame A, and with the opposite end on a collar T, attached to the piston-rod between the aforesaid bracket and cam, as clearly shown in Fig. 11 of the drawings.

For directing the air between the raised front edge of the top sheet and subjacent sheet I prefer to employ the fingers $l'$ by forming them hollow and with the discharge-openings in the ends thereof, as illustrated in Fig. 15 of the drawings. Said fingers are thus made to perform three important functions—viz., first, to hold the second sheet to a certain degree while drawing the top sheet rearward by the feeding instruments; secondly, to hold the second sheet down while blowing air over it, and, thirdly, to direct the air-blast between the top sheet and subjacent sheet. The air is conducted from the main pipe N to the tubular fingers $l'$ $l'$ by means of hose or flexible tubes V, connecting said parts.

It will be observed that the longitudinal movements of the within-described sheet-moving combers, sheet lifters and carriers, and the action of the air-pumps and raising of the paper-supporting table are all derived from cams attached to the driving-shaft $a$, which cams are so shaped as to impart their requisite movements to the respective mechanisms at the proper times to perform their functions in the order hereinbefore stated.

While I have shown the automatically-controlled sheet-shifting device in the form of sheet-combers, I would have it understood that I do not limit myself to this specific form of sheet-moving instruments, except in those claims specifically referring to combing devices. In some of my claims I have used such terms as "sheet-shifting means" or "sheet-advancing means," and in such claims I intend to cover any and all forms of feeding instruments employed and controlled automatically in the manner defined. These broad claims for my improved automatically-controlled sheet-shifting means cover such structures as illustrated in my pending applications, Serial No. 595,373, filed June 12, 1896, Serial No. 617,263, filed December 28, 1896, and Serial No. 659,366, filed November 22, 1897, and I would have it understood that the automatically-controlled feeding instruments described and illustrated in said pending applications are subject to the broad claims in my present application.

In some of my claims I have covered, in combination with certain named essential elements, "a yielding connection between the driving mechanism and the advancing means." This structure is illustrated in the form of machine shown in the accompanying drawings by the spring interposed between the rider-bracket supporting the sheet-advancing instrument and the feeder-carriage, the carriage being considered in this form of the mechanism as a part of the driving mechanism. I do not, however, limit myself to the specific form of mechanism shown, but consider this part of my invention sufficiently broad to cover the combinations recited in any form of paper-feeding machine producing substantially the same result.

What I claim as my invention is—

1. In combination with the main frame, a carriage moving parallel with the line of feed, a main air-pipe mounted on the carriage and disposed over the front portion of the pile of paper at right angles to the line of feed, tubes carried vertically on said pipe and communicating therewith and movable to and from the top of the pile of paper, a rotary cam depressing said tubes, springs lifting the tubes, an air-pump attached to one end of the main pipe, the piston-rod of said pump extending longitudinally through the main pipe, a collar fixed to the protruding end of said rod, an expansive spiral spring interposed between said collar and adjacent end of the pipe, a lever pivoted to the main frame and adapted to engage by one of its ends the aforesaid end of the piston-rod to force the piston in one direction when the carriage is in its extreme rear position, a rotary cam actuating said lever, a catch retaining the pump-piston at the end of its aforesaid stroke, and a tripper on the main frame throwing the catch out of engagement when the carriage arrives at its extreme forward position, substantially as set forth and shown.

2. In combination with the main frame and carriage traveling parallel with the line of feed, the main air-pipe mounted on the carriage and disposed transversely over the pile of paper, the pump alternately drawing and forcing the air from and into said pipe, brackets attached to the pipes and provided with vertical guides, tubes sliding in said guides, flexible tubes connecting said sliding tubes with the main pipe, springs lifting the sliding tubes, a rock-shaft mounted on the brackets and disposed parallel with the main pipe, arms fastened to the rock-shaft and depressing the sliding tubes, a rotary cam, and a crank on the rock-shaft engaging the cam and imparting motion to said shaft, substantially as described and shown.

3. In combination with the air-suction pipe, the vertically-movable tube having a solid diaphragm secured to its interior, a flexible tube connected to said movable tube below the diaphragm and communicating with the aforesaid suction-pipe, a semispherical bearing on the lower end of the tube to form a universal joint therewith, and a spring connecting said bearing to the aforesaid diaphragm, as set forth and shown.

4. In combination with the main air-pipe, brackets attached to said pipe, vertically-movable tubes carried on said brackets, springs lifting the tubes, diaphragms secured in said tubes, plungers in the tubes above the diaphragms, springs interposed between the plungers and diaphragms, a rock-shaft parallel with the main pipe, and arms on said rock-shaft bearing on the plungers, substantially as set forth and shown.

5. In combination with the sheet-lifters engaging the front portion of the top sheet, a main air-blast pipe extending across the front of the pile of paper beneath the plane of the feed, and vertically-yielding branch pipes communicating with said main pipe and supported at their free ends upon the top of the pile of paper to automatically descend with the reduction of the height of the pile, as set forth.

6. In combination with the sheet-lifters raising the front portion of the top sheet, a main air-blast pipe extending across the front of the pile of paper beneath the plane of the feed, a stationary shaft over said pipe, branch pipes or tubular fingers hinged to said shaft and resting with their free open ends upon the top of the pile of paper, springs pressing said ends of the fingers downward, stops secured to the aforesaid shaft limiting the downward movement of the fingers, and flexible tubes connecting with said fingers with the main pipe, as set forth.

7. The combination of the main frame provided with longitudinal guides in its sides, a carriage sliding in said guides, parallel with the line of feed, longitudinal racks on the carriage, posts rising from the main frame, a transverse rock-shaft mounted on said posts, segments fastened to said shaft and engaging the aforesaid racks, an arm fixed to the rock-shaft, a cam on the driving-shaft, a pitman connecting said cam with the arm of the rock-shaft, a main air-pipe extending across the machine and mounted on the carriage, tubes carried vertically on said main pipe and communicating therewith and movable to and from the top of the pile of paper, a rock-shaft parallel with the main pipe, arms on said rock-shaft depressing the aforesaid tubes, springs lifting said tubes, an arm on the latter rock-shaft, a cam on the driving-shaft actuating said arm, a pump attached to the end of the main pipe, a rotary cam forcing the piston of said pump from the main pipe, a catch on the pump retaining the piston at the end of said latter movement, a tripper on the main frame throwing the catch out of engagement in the latter part of the forward movement of the carriage and a spring forcing the piston back, to its original position, as set forth.

8. A paper-feeding machine comprising a comber reciprocated back and forth over the pile of paper, a lifter raising the comber from the paper preparatory to the movement of said comber in one direction, a latch retaining the comber in its raised position, and a tripper releasing the comber and allowing the same to drag upon the paper during the reverse movement of the comber, as set forth.

9. In a paper-feeding machine a preliminary sheet-separator consisting of a comber reciprocated back and forth over the pile of paper, a spring depressing said comber to the top of said pile, a lug in one end of the path of the comber raising the same from the paper, a latch on the comber retaining the same in its raised position, and a tripper in the opposite end of the path of the comber releasing the same from the latch, as set forth.

10. A paper-feeding machine comprising fingers bearing on top of the front portion of the pile of paper, combers traversing the top surface of said pile and dragging upon the top sheet and drawing the same rearward from under said fingers, and paper-lifters engaging the released front edge of the top sheet and carrying said sheet to the delivery end of the machine, as set forth.

11. In a paper-feeding machine the combination of a main air-suction pipe extending transversely over the pile of paper, and movable toward and from the delivery end of the machine, a series of vertical tubes connected to said pipe and movable to and from the top of the pile of paper, fingers bearing on top of the front portion of the pile, and combers drawing a plurality of the upper sheets rearward and the top sheet from under said fingers, as set forth.

12. In a paper-feeding machine, the combination of a main air-blast pipe, tubular fingers bearing on top of the front portion of the pile of paper and receiving air from said main pipe, combers drawing a plurality of upper sheets rearward and the top sheet from under said fingers, paper-lifters raising the front edge of said top sheet from the pile, and an air-pump actuated to force air into the aforesaid main pipe after said edge of the sheet is lifted, the air-blast passing under said sheet and buoying the same in its transit from the pile, as set forth.

13. In a paper-feeding machine, the combination of a main air-blast pipe, tubular fingers bearing on top of the front portion of the pile of paper and receiving air from said main pipe, combers drawing a plurality of upper sheets rearward and the top sheet from under said fingers, vertically-movable suction-tubes lifting the released front edge of the top sheet, a pump actuated to force air into the aforesaid blast-pipe after the sheet is lifted by said suction-pipes, and a pump actuated to produce alternate suctions and blasts through said suction-pipes and thereby lift and release the sheet, as set forth.

14. In a paper-feeding machine, the combination of a carriage moving parallel with the line of feed, an air-pipe extending across the machine over the pile of paper and mounted on the carriage, vertically-movable paper-lifting tubes connected to said pipe, air-blowing pipes having their discharge ends resting on top of the front portion of the pile of paper, air-pumps connected to the aforesaid pipes, combers drawing the top sheet from under said blowing-pipes, and a plurality of cams all mounted on the driving-shaft to rotate in unison and actuating said carriage, vertically-movable tubes, and pumps consecutively in the order herein specified.

15. In combination with the main frame, guides parallel with the plane of feed, a carriage sliding in said guides toward and from the delivery end of the machine, rider-brackets movable longitudinally on said carriage, springs coupling the rider-brackets to the carriage, means for periodically arresting the feeding movement of the rider-brackets, sheet-shifting instruments pivoted to the rider-brackets, and means traveling with the carriage for throwing the sheet-shifting instruments out of contact with the paper preparatory to moving in the opposite direction, as set forth.

16. In combination with the main frame, guides parallel with the plane of feed, a carriage sliding in said guides, rider-brackets movable longitudinally on the carriage, springs coupling the rider-brackets to the carriage, means for arresting periodically the feeding movement of the rider-brackets, sheet-shifting instruments connected to the rider-brackets adjustably to different positions to operate on paper of different sizes, and means carried adjustably on the carriage to operate upon the sheet-shifting instruments and throw the same out of contact with the paper preparatory to moving in the opposite direction, as set forth.

17. In combination with the main frame, guides parallel with the plane of feed, a carriage sliding in said guides, rider-brackets movable longitudinally on the carriage, springs coupling the rider-brackets, to the carriage, means arresting periodically the feeding movement of the rider-brackets, sheet-shifting instruments pivotally mounted on the rider-brackets, catches connected to the rider-brackets, and adapted to engage and support the sheet-shifting instruments in their raised positions during their return or inoperative movement, and means carried on the frame for throwing the catches out of engagement with the feeding instruments, as set forth.

18. In combination with the carriage moving back and forth parallel with the plane of feed, rider-brackets movable longitudinally on the carriage and connected thereto by longitudinal spiral springs, ratchets on said rider-brackets, dogs adapted to engage the ratchets and thereby arrest the feeding movement of the rider-brackets, electromagnets moving the dogs out of engagement, an electric circuit, a circuit-closer actuated by contact of the edge of the moved sheet, sheet-shifters carried on the rider-brackets and moving the top sheet into contact with the circuit-closer, and means traveling with the carriage and throwing the sheet-shifters out of contact with the paper preparatory to moving forward in the reverse direction, as set forth.

19. In combination with the main frame and driving-shaft, a carriage movable to and from the delivery end of the machine, racks on said carriage, a rock-shaft operating the racks, an arm attached to the said shaft, means on the driving-shaft imparting motion to said arm, rider-brackets movable longitudinally on the carriage and connected thereto by longitudinal spiral springs, rack-bars or ratchets on said rider-brackets, dogs adapted to engage the ratchets and thereby arrest the feeding movement of the rider-brackets, electromagnets moving the dogs out of engagement, an electric circuit, a circuit-closer actuated by contact of the edge of the moved sheet, sheet-shifters carried on the rider-brackets and moving the top sheet into contact with the circuit-closer and means traveling with the carriage and throwing the sheet-shifters out of contact with the paper preparatory to moving in the reverse direction, as set forth.

20. In combination with the carriage moving toward and from the delivery end of the machine, air-suction pipes carried on the front portion of the carriage and movable to and from the top of the pile of paper to lift and carry the top sheet forward, riders movable longitudinally on the carriage, longitudinal spiral springs coupling said riders to the carriage, ratchets on the riders, dogs on the frame engaging the ratchets and thereby arresting the rearward movement of the riders, electromagnets throwing the dogs out of engagement, an electric circuit, a circuit-closer actuated by the rear edge of the top sheet, combers carried on the riders and drawing said sheet rearward into contact with the circuit-closer, and lugs traveling with the carriage and throwing the combers out of engagement preparatory to moving forward, as set forth.

21. In combination with the main frame, a vertically-movable table and mechanism for elevating said table automatically, a bar extending across the machine and secured to the frame adjustably lengthwise of the latter, an electrically-controlled stop-motion connected with the elevating mechanism and having its circuit-controller mounted on the aforesaid bar adjustably lengthwise thereof and actuated by a gage resting upon the pile of paper, the adjustment of the bar onto the frame and adjustment of the circuit-controller on said bar accommodating said circuit-controller to paper of different lengths and widths, as set forth.

22. In a paper-feeding machine, the combination with the main frame, vertically-movable paper-supporting table and driving-shaft, of a shaft extending transversely over the table and mounted in bearings secured to the main frame, drums attached to opposite ends of the said shaft, sheaves on the sides of the main frame, cables or chains secured at opposite ends of the drums and aforesaid table and running intermediately on the sheaves, a gear on the aforesaid transverse shaft, a counter-shaft, a worm on the latter shaft engaging the aforesaid gear, a ratchet-wheel attached to the counter-shaft, a rock-arm mounted loosely on said shaft, a cam on the driving-shaft actuating said rock-arm, a pawl connected to the latter for engaging the ratchet-wheel, an electric circuit, an electromagnet drawing the pawl out of engagement, and an electric-circuit controller having its removable pole held normally out of electric contact by means of a gage disposed yieldingly over the aforesaid table and normally in the plane of the feed, all combined to operate substantially as set forth.

23. A paper-feeding machine comprising a vertically-movable table for carrying the paper piled squarely upon the same, fingers bearing upon said pile at one end thereof, sheet-shifting instruments operating upon the top of the pile of paper and shifting the top sheet from under the aforesaid fingers, mechanisms operating the sheet-shifting instruments independently of each other, stop mechanism controlling the shifting instruments and actuated by the advanced edge of the shifted top sheet, and paper-feeding devices removing the shifted top sheet from the pile, as set forth.

24. In combination with the main frame, a longitudinally-movable carriage, sheet-shifting instruments carried on said carriage, mechanism for throwing the sheet-shifting instruments into and out of contact with the top of the pile of paper, a rod extending across the machine and connected to the frame adjustably in the direction of the feed, brackets mounted on said rod adjustably at right angles to the line of feed, an electric circuit, a circuit-controller connected to each of said brackets to be actuated by the advanced edge of the top sheet, electromagnets in said circuit, and stop-motions controlled by the armatures of the said magnets.

25. In combination with the main frame and longitudinally-movable carriage, longitudinal bars mounted laterally adjustable on said carriage, sheet-shifting instruments, carried on said bars, mechanisms mounted on said bars and operating the sheet-shifting instruments, a cross-bar secured to the main frame, magnets mounted on said cross-bar adjustably longitudinally in relation to the same to conform said magnets to the adjustment of the aforesaid longitudinal bars and control the aforesaid mechanisms, and circuit-controllers supported on the main frame adjustable laterally and actuated by the advanced edge of the top sheet of paper, as set forth.

26. In combination with the main frame and combers, a rod extending across the front of the frame and rigidly secured thereto, brackets secured to said rod and provided with rearwardly-projecting perforated ears and with tongues under said ears and projecting beyond the same, fingers hinged to said ears, and springs imparting downward pressure to the fingers, as set forth.

27. In a machine for feeding sheets of paper from a pile, the combination of means for advancing the top sheet thereof and mechanism for operating said advancing means, of a tripper adapted to be operated by the top sheet and means controlled by the tripper and adapted to engage the advancing means and arrest the operation of said advancing means upon the sheet, substantially as described.

28. In a machine for feeding sheets of paper from a pile, the combination of means for advancing the top sheet thereof, and mechanism for operating the advancing means, of a tripper arranged in the path of the top sheet and adapted to be operated thereby and means operated by the tripper adapted to engage the advancing means and arrest the advancing operation of said advancing means, substantially as described.

29. In a machine for feeding sheets of paper from a pile, the combination of means for advancing the top sheet thereof and mechanism for operating said advancing means, of a tripper adapted to be operated by the top sheet, a rack carried by the advancing means, and means operated by said tripper adapted to engage said rack and thereby arrest the advancing operation of the advancing means, substantially as described.

30. In a machine for feeding sheets of paper from a pile, the combination with means for advancing the top sheet thereof, and mechanism for operating said advancing means, of a tripper suspended in the path of the top sheet and adapted to be operated thereby, a rack carried by the advancing means, and a pawl adapted to be operated by the tripper to engage said rack and thereby check the forward movement of the advancing means.

31. In a machine for feeding sheets of paper from a pile, the combination with means for moving the top sheet thereof, and mechanism for operating said sheet-moving means, of a tripper suspended in the path of the top sheet and adapted to be operated thereby, a rack carried by the sheet-moving means, and a pawl adapted to be operated by the tripper to engage said rack and thereby arrest the operation of the sheet-moving means.

32. In a paper-feeding machine, the combination with means for shifting the top sheet of the pile in a direction parallel with the line of feeding, and mechanism for operating said shifting means, of a tripper in the path of the top sheet to be actuated thereby, a rack carried by the sheet-shifting means, and a pawl controlled by the tripper and constructed to engage said rack and thereby check the movement of the sheet-shifting means.

33. In a machine for feeding sheets of paper from a pile, the combination of a main shaft and means adapted to advance the top sheet on said pile, of means for moving said advancing means forward and returning said advancing means to their initial position, means for checking the forward movement of the advancing means adapted to be operated by said top sheet and means for raising the advancing means out of contact with the top sheet after the forward movement of said advancing means has been checked, as set forth.

34. In a machine for feeding sheets of paper from a pile, the combination of means for advancing the top sheet thereof, and mechanism for operating said advancing means, of a tripper, arranged in the path of the top sheet and adapted to be operated thereby, a rack carried by the advancing means and a pawl adapted to be operated by the tripper to engage said rack and thereby check the forward movement of the advancing means, as set forth.

35. In a machine for feeding sheets of paper from a pile, the combination with the mechanism for advancing the top sheet thereof, comprising a sheet-shifter having a rectangular path of travel and constructed to press upon the top sheet of the pile during its travel in one direction to advance said top sheet from the pile, and mechanism for automatically checking the advancing movement of the sheet-shifter, said mechanism being engaged by the top sheet as it advances and actuated by the continued advancement of said top sheet, substantially as described.

36. In a machine for feeding sheets of paper from a pile, the combination with mechanism for advancing the top sheet thereof, comprising a sheet-shifter having a rectangular path of travel and constructed to press upon the pile during its travel in one direction, mechanism for automatically arresting the movement of the sheet-shifter when it is in engagement with the pile, said mechanism being operated by the top sheet as it advances, and means for automatically raising the sheet-shifter after it has advanced the top sheet, substantially as described.

37. In a machine for feeding sheets of paper from a pile, the combination with mechanism for advancing the top sheet thereof, comprising a sheet-shifting instrument having a rectangular path of travel, mechanism for automatically checking the movement of the shifting instrument when in operative engagement with the top sheet of the pile, said mechanism comprising a tripper arranged in the path of the top sheet and adapted to be engaged by said sheet as it advances and be moved thereby to actuate the checking mechanism by the continuous advancement of said sheet, substantially as set forth.

38. In a machine for feeding sheets of paper from a pile, the combination with mechanism for advancing the top sheet thereof, comprising a sheet-moving instrument having a rectangular path of travel and constructed to press upon the pile during its movement in one direction, of a tripper arranged in the path of the top sheet and adapted to be operated thereby to check the forward movement of the sheet-moving instrument, and means for automatically raising the sheet-moving instrument after its movement has been checked, substantially as described.

39. In a machine for feeding sheets of paper from a pile, the combination with mechanism for advancing the top sheet thereof, comprising a sheet-moving instrument having a rectangular path of travel and constructed to press upon the pile during its movement in one direction, of mechanism for imparting to said sheet-moving instrument an intermittent vertical and horizontal movement, and means for arresting the horizontal movement in one direction adapted to be operated by the continued advancement of the sheet of paper after it engages said arresting means, substantially as set forth.

40. In a machine for feeding sheets of paper from a pile, the combination with means for advancing the top sheet of said pile, including a sheet-shifting instrument, suitable driving mechanism for the advancing means, a yielding connection between said sheet-advancing means and the driving mechanism, and a trip controlled by the advanced sheet to arrest the operation of the advancing instrument, substantially as set forth.

41. In a machine for feeding sheets of paper from a pile, the combination with means for advancing the top sheet of said pile including a sheet-shifting instrument, suitable driving mechanism, an operating rod or bar extending from the driving mechanism to the sheet-advancing means, a yielding connection between said rod or bar and the advancing means and a tripping device actuated by the shifted sheet adapted to stop the sheet-shifting movement of the shifting instrument while the driving mechanism continues in operation, substantially as set forth.

42. In a machine for feeding sheets of paper from a pile, the combination with means for advancing the top sheet of said pile including a sheet-shifting instrument, suitable driving mechanism, a yielding connection between the driving mechanism and the advancing means, means for checking the movement of the advancing means, without interfering with the regular operation of the driving mechanism, and means for elevating the sheet-shifting instrument out of engagement with the sheet when the movement of the advancing means is checked, said elevating means being operated by the relative movement between the driving mechanism and advancing means permitted by said yielding connection, substantially as set forth.

43. In combination with the carriage, a rider-bracket having a ratchet and mounted longitudinally movable upon said carriage, a feeding instrument connected with said rider-bracket, a spring yieldingly holding the rider-bracket in position upon the carriage, a dog adapted to arrest the movement of the rider-bracket upon the carriage, without stopping the carriage, and suitable means holding the dog out of engagement and controlled by the sheet fed from the pile, by the feeding instrument, substantially as set forth.

In testimony whereof I have hereunto signed my name this 6th day of July, 1894.

TALBOT C. DEXTER. [L. S.]

Witnesses:
J. J. SAASS,
C. L. BENDIXON.